May 23, 1972     D. F. McPHERSON     3,664,663

PAPER CASSETTE LOADING DEVICE

Filed May 18, 1970     2 Sheets-Sheet 1

INVENTOR.
DONALD F. MC PHERSON

BY

*ATTORNEY*

May 23, 1972  D. F. McPHERSON  3,664,663

PAPER CASSETTE LOADING DEVICE

Filed May 18, 1970  2 Sheets-Sheet 2

United States Patent Office 3,664,663
Patented May 23, 1972

3,664,663
PAPER CASSETTE LOADING DEVICE
Donald F. McPherson, Hilton, N.Y., assignor to Xerox Corporation, Stamford, Conn.
Filed May 18, 1970, Ser. No. 38,466
Int. Cl. B65h 1/04
U.S. Cl. 271—61                3 Claims

ABSTRACT OF THE DISCLOSURE

Apparatus for locating the feed rollers and paper snubbers of a sheet feeding mechanism in an inoperative position remote from the leading edge of sheets in a cassette while the cassette is being loaded into a copier so that the sheets in the cassette are not bent, ripped or otherwise deformed during loading, and then locating the feed rollers and paper snubbers in an operative position on the top sheet in the cassette in preparation for feeding the sheets from the cassette to the copier.

BACKGROUND OF THE INVENTION

This invention relates to loading a cassette of sheet material into a copier, and more particularly, to an apparatus for preventing the feed rollers and paper snubbers of the sheet feeding mechanism from contacting the sheets before the cassette is fully loaded into the copier.

In copiers widely used in business offices, the paper or other material upon which a copy is made is generally provided in sheets of predetermined size which are fed through the copier one at a time to be processed. Since copies can be made in quick succession, it has been found advantageous to place a stack of sheets in a sheet-feeding mechanism and automatically feed the sheets one at a time from the stack into the copier as the copier requires them. When such a sheet feeding mechanism is used, the operator of the copier need not be concerned with supplying new sheets to the copier until the stack has been depleted or the size of the sheet is to be changed.

A problem often encountered in loading a stack of sheets into a copier is that the sheet size requirements of the copier may change from time to time necessitating that the entire stack be removed from the copier and replaced by another stack of different size. When the sheet supply is maintained in a loose pile which is simply placed into a tray or some other container in the copier, the changing of the paper size can be a difficult and unmanageable task since the sheets in the stack may become disarranged and their edges bent or torn as the stack is loaded and unloaded from the machine.

One method of keeping the stack of sheets in perfect alignment during loading and unloading is to place sheets in a sheet container or cassette which can be removed from the copier. When a cassette is used to hold the sheets, the opertaor need only handle the cassette in changing the size of the paper and refilling the paper supply in the copier. The cassette prevents the sheets in the stack from becoming disarranged and prevents contact between the edges of the sheets and external hard objects which may otherwise bend or tear the sheets since the stack is always protected by the cassette. The cassette can be made of an inexpensive material such as heavy paper, cardboard, plastic, metal, etc. and contains a flap at its front edge which is opened before it is loaded into the copier so that sheets can be fed from the cassette to the copier.

Since the flap in the front edge of the cassette is opened before the cassette is engaged by the feeding machanism which feeds the sheets from the cassette to the copier, the portion of the stack of sheets adjacent the flap is exposed to the feeding mechanism as the cassette is loaded into the copier. For example, one type of feeding mechanism that can be used has feed rollers and paper snubbers which engage the top sheet in the cassette. If the feed rollers and snubbers contact the stack of sheets during the loading process, the edges of the sheets, particularly the uppermost sheets, can be bent, wrinkled and torn. It is undersirable to tear, wrinkle, or otherwise mutliate the edges of sheets in the stack, especially those edges that face the copier and which lead the sheet through the copying machine, since such an imperfection can easily cause paper jams. In addition to the problem of paper jams, the copy that exits from the machine has a generally bad appearance due to the ragged or torn edge.

A method of preventing the leading edge of the sheets in a paper cassette from becoming bent and torn during loading is to move the feed rollers and snubber members away from their respective normal positions for feeding so that they do not contact the sheets in the cassette at any time prior to the time the cassette is fully loaded into the copier. The present invention is an apparatus for automatically locating the feed rollers and paper snubbers in an inoperative position as a cassette of sheets is loaded into a copier. The apparatus includes a mechanism which lifts the feed rollers and snubbers out of the path of the cassette in response to the cassette being loaded into the copier so that the feeding mechanism does not interfere with the sheets in the cassette. As the cassette reaches its fully loaded position the feed rollers and snubbers are dropped onto the stack of sheets so that the feeding mechanism is engaged with the top sheet in the cassette in preparation for feeding of the sheets to the copier.

Accordingly, it is an object of the present invention to improve apparatus for loading a stack of sheets into a copier.

It is another object of the invention to avoid multilation of the edges of sheets as they are loaded into a copier.

It is another object of the invention to automatically lift the feed rollers and paper snubbers of a feeding mechanism to an inoperative position in response to a stack of sheets being loaded into a copier.

It is another object of the invention to engage the feed rollers and paper snubbers of a sheet feeding mechanism with the top sheet of a stack of sheets as the stack is fully loaded in a copier.

It is another object of the invention to automatically locate the feed rollers and paper snubbers of a sheet feeding mechanism in an inoperative position in response to a cassette of sheets being loaded into a copier in an operative position for feeding sheets from the cassette in response to the cassette reaching its fully loaded position.

SUMMARY

The apparatus disclosed herein is for locating the feed rollers and paper snubbers of a sheet feeding mechanism in an inoperative position in response to inserting a sheet cassette into the copier so that sheets in the cassette are not contacted by the feeding mechanism until fully loaded. As the cassette reaches its fully loaded position, feed rollers and paper snubbers in the feeding mechanism are permitted to drop into an operative position where they engage the sheets in the cassette in preparation for feeding the sheets from the cassette to the copier.

The feed rollers and paper snubbers are mounted on a movable frame having a first position placing the feed rollers and snubbers in their respecctive operative position for feeding sheets from the cassette and a second position placing them in their respective inoperative positions. In order to insert a cassette into the copier along a cassette support which is fastened to the frame of the copier, a bar must be depressed level with the cassette support from a biased position. The movement of the bar, through a linkage, lifts the movable frame to bring the feed rollers and snubber members into their inoperative position. Then, as the cassette reaches its fully loaded position, the linkage is released so that movable frame is allowed to drop into the position where the feed rollers and snubbers engage the top sheet in the cassette.

BRIEF DESCRIPTION OF THE DRAWINGS

For a better understanding of the invention as well as other objects and further features thereof, reference is had to the following description of the invention to be used in conjunction with the accompanying drawings.

DESCRIPTION OF THE PREFERRED EMBODIMENT

The present invention can be used in an apparatus wherein a cassette containing sheets of paper or the like is inserted into a feeding mechanism which is adapted to feed the sheets from the cassette to a work station. For the purpose of this disclosure, however, the invention is described as part of a xerographic copier which receives sheets one at a time from the cassette for processing into a copy.

Figure 1:
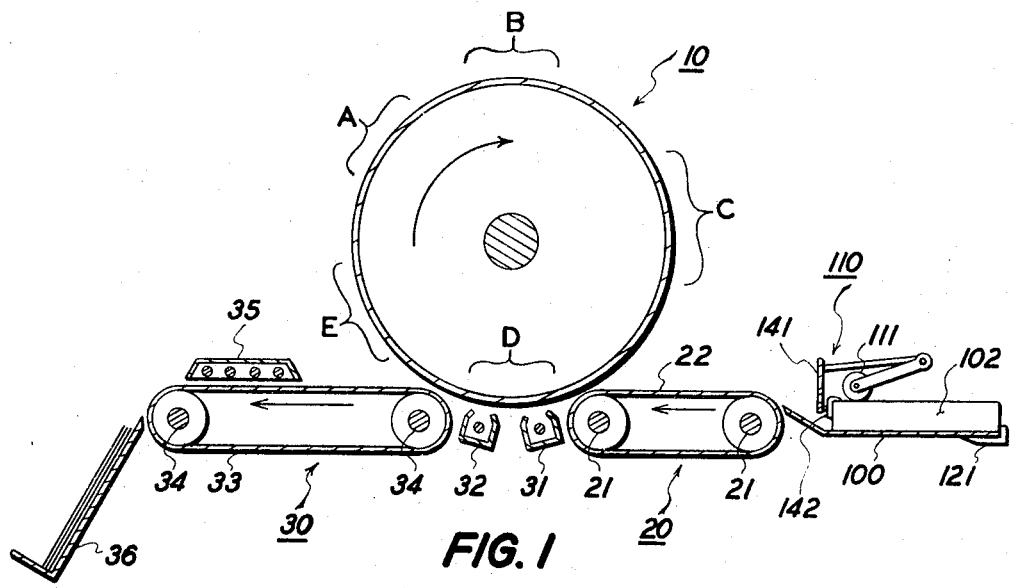
FIG. 1 is a schematic view of the invention in a xerographic copier.

FIG. 1 is a schematic illustration of a xerographic copier employing the invention. A reusable photoconductive drum 10 is rotated through a number of processing stations in the direction shown by the arrow to produce a toner image of the information to be reproduced. The drum passes through charging station A where a uniform electrostatic charge is placed on its photoconductive surface, and through exposing station B where a light image conforming to the information to be reproduced is focused on the charged surface of the drum in synchronism with the movement thereof. The charge in the areas of the drum struck by the light areas of the light image is dissipated while the charge on the remaining areas remains relatively unaffected by the light. The resulting charge pattern on the drum produces a latent electrostatic image on the surface of the drum conforming to the light image of the information being reproduced. The latent image then passes through developing station C where a powder material is applied to the surface of the drum to develop the image. The powder applied in station C adheres to the image areas of the charge pattern to form a toner image on the surface of the drum.

The drum next passes through transfer station D where the toner image is electrostatically transferred to a copy sheet. A copy sheet is fed from cassette 102 to conveyor mechanism 20 by a feeding mechanism 110 having feed rollers 111 working in conjunction with paper snubbers 142. The operation of the feeding mechanism is described in more detail below. The top sheet in the cassette is fed onto conveyor mechanism 20 which moves it into the transfer station. Conveyor mechanism 20 inccludes an endless movable belt 22 supported and driven by rollers 21 in a counterclockwise direction. As the leading edge of a copy sheet is fed onto belt 22 by feeding mechanism 110 the belt moves the sheet out of the cassette and into transfer station D in synchronism with the movement of the toner image on the surface of drum 10.

The toner image on the drum is electrostaically attracted to the copy sheet at station D by any suitable device such as corona charging device 31. Any charge placed on the sheet by device 31 is then neutralized by charging device 32 enabling the sheet to fall onto conveyor mechanism 30. Conveyor mechanism 30 has an endless belt 33 supported and driven in a counterclockwise direction by rollers 34. Belt 33 brings the copy sheet under fuser 35 which fixes the toner image to the copy sheet. The copy sheet having the fixed toner image then falls into storage tray 36 where it remains until removed by the operator of the copier.

After the toner image is transferred to the copy sheet at station D, the drum rotates through cleaning station E where any residual toner image on the drum surface is removed in preparation for the next copy cycle. Any suitable device can be used in this station to effect cleaning such as fur brush which rubs against the surface of drum 10 and removes the toner therefrom.

A stack of copy sheets is contained within cassette 102 and the cassette can be loaded into the copier and removed from it as necessary to change the sheet size, to refill the paper supply, or for any other purpose. The loading of the cassette is achieved manually by the operator of the machine. The operator places the leading edge of the cassette onto the support 100 and then slides the cassette towards the feeding mechanism 110 until it reaches its fully loaded position shown in FIG. 1. In order to place the leading edge of the cassette on support 100 and have it slide freely along the support, bar 121, which is linked to the feeding mechanism 110 and biased upwards in a manner to be described below, is depressed to a level even with the support by the bottom of the cassette. When the bar is depressed by the presence of the cassette on the support 100, feed rollers 111 and paper snubbers 142 are brought to an inoperative position remote from the path of the sliding cassette to avoid any damage to the sheets in the cassette during loading. As the cassette reaches its fully loaded position, it activates a mechanism which allows the feed rollers and paper snubbers to engage the sheets in the cassette in preparation to feeding the sheets from the cassette.

Figure 2:
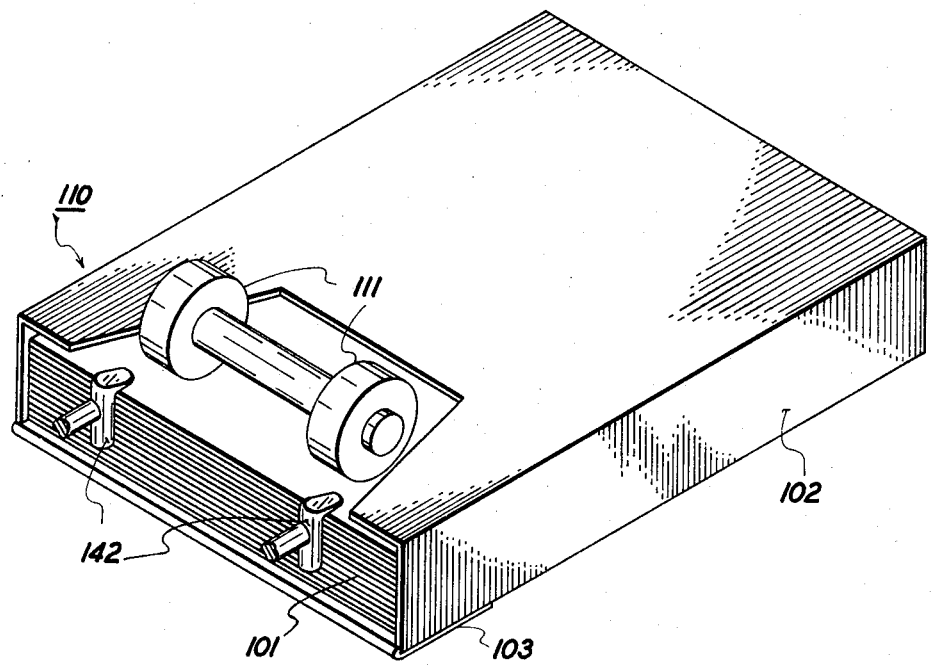
FIG. 2 is a schematic view of the sheet cassette with the feed rollers and paper snubbers in their operative positions.

FIG. 2 is a more detailed view of the cassete and parts of the feeding mechanism which engages the sheets in the cassette. The cassette can be made of any suitable material; for instance, cardboard, plastic, stiff paper, metal, etc. It has a flap portion 103 which is normally closed while the cassette is not in the copier. The purpose of the flap is to prevent dust and other foreign matter from entering the cassette while the cassette is not being used and to prevent the leading edge of the sheets in the cassette from being damaged during storage. It is designed to encompass all portions of the sheets in the cassette when closed.

The flap opens to the position shown in FIG. 2 before the cassette is loaded into the machine so that sheets can be fed from it. To prepare the cassette for loading, the flap is rotated to the bottom of the cassette into the position shown in FIG. 2 thereby exposing the leading edge of sheets 101. The operator places the leading edge of the cassette, flap down, on support 100 and slides it to its fully loaded position.

FIG. 2 shows the position of the feed rollers and paper snubbers relative to the cassette when the cassette is fully loaded into the copier. If no provision were made to place the feed rollers and paper snubbers in their respective inoperative positions as the cassette slides towards the feeding mechanism during loading, the leading edge portions of the sheets in the cassette would strike feed rollers 111 and paper snubbers 142 as the cassette approaches its fully loaded position. The purpose of the apparatus described in detail herein is to avoid contact between the feed rollers and paper snubbers and the sheets in the cassette during the loading process so that the leading edge of the sheet is not bent, torn, or otherwise multilated during loading. In accordance with the invention, such contact during the loading process is avoided by lifting the feed rollers and paper snubbers to a remote, inoperative position until the cassete is fully loaded.

Once the cassette is loaded into the copier and the sheets are engaged by the feed rollers and paper snubbers, feeding of the sheets from the top of the cassette is carried out as follows. The feed rollers 111 rest on top of the stack of sheets while the paper snubbers 142 are resting on the top sheet of the stack 101 as well as along the leading edge of the stack. The feed rollers rotate in the counterclockwise direction pulling the top sheet in the stack far enough back so that its leading edge is out from under the snubbers. The snubbers then drop onto the second sheet in the stack and clamp it securely so that it cannot move. After the snubbers grip the second sheet the feed rollers rotate in the clockwise direction feeding the top sheet over the snubbers and toward the transfer station of the copier. After the top sheet has been fed completely out of the cassette the next sheet in the stack becomes the top sheet and the cycle is repeated to feed it to the transfer station. The feed rollers and snubbers are supported by frame 141, shown in FIG. 1, and are held against the top sheet in the stack by gravity or, in the alternative, any suitable biasing mechanism.

Figure 3A:
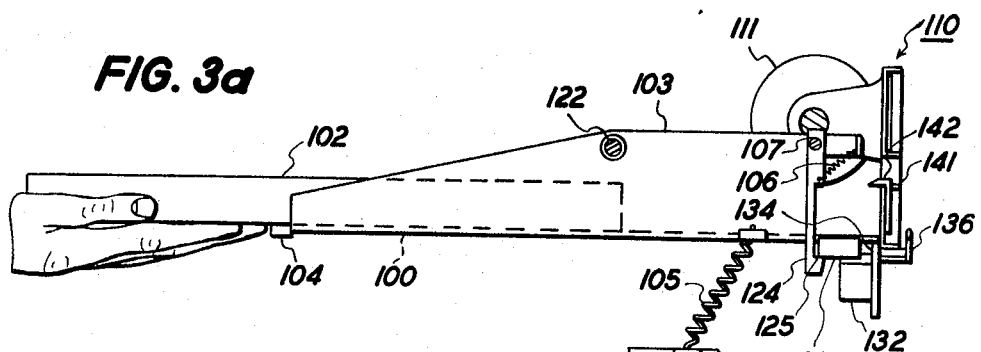
FIGS. 3a–c are partial side views of the invention.
Figure 3B:
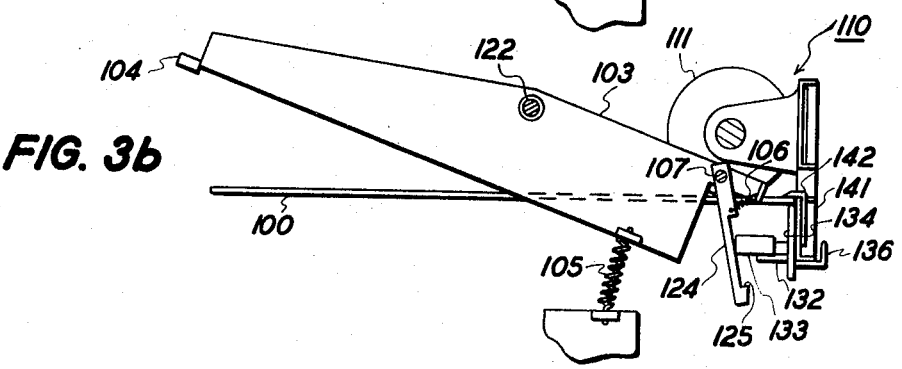
Figure 3C:
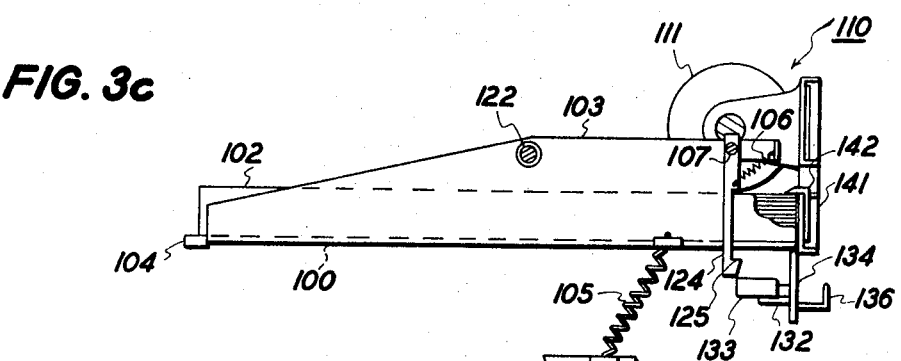
Figure 4A:
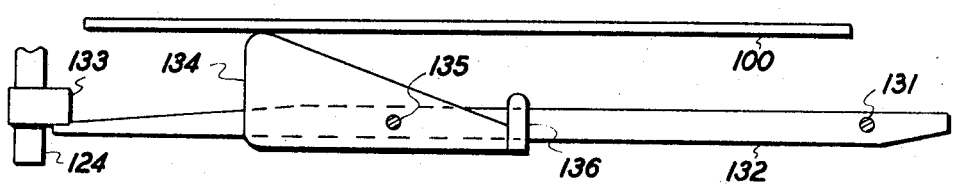
FIGS. 4a–b are partial rear views of the invention.
Figure 4B:
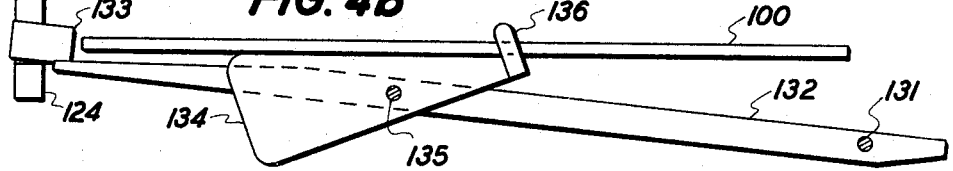

The mechanism which lifts the feed rollers and snubbers to their inoperative positions while a cassette is being loaded into the copier and then releases the feed rollers and snubbers onto the top sheet is shown in FIGS. 3a–c and 4a–b. FIGS. 3a–c are partial side view of the cassette loading mechanism and FIGS. 4a–b are partial back views of the mechanism. Referring to FIGS. 3a–c, support 100 is rigidly attached to the machine frame and has a top surface upon which the cassette 102 slides as it is being loaded into the copier. Support 100 has an open end to the left where the cassette is inserted to the copier and a feeding end to the right in the vicinity of feeding mechanism 110. Adjacent to support 100 is arm 103 which is supported by and capable of revolving about rod 122 which is fixed to the machine frame. Arm 103 contains a bar 104 on one end and a latch 124 on the other end. Regarding the different positions of these elements in FIGS. 3a–c, arm 103, bar 104, snubbers 142, and rollers 111 assume the positions in FIG. 3a when a cassette is partially loaded in the loading device, the positions in FIG. 3b when there is no cassette, or a cassette having no paper therein, in the loading device, and the positions in FIG. 3c when a cassette containing sheets therein is fully loaded in the copier.

Arm 103 is biased in the counterclockwise direction by the cassette assuming the position shown in FIG. 3a. As the leading edge of the cassette 102 is manually placed upon the open end of support 100, its presence causes bar 104 to move down to the level of the support which, in turn, causes arm 103 to rotate in the counterclockwise direction. The action causes bar 104 to be located level with support 100 and the feeding mechanism 110 to lift to an inoperative position shown in FIG. 3a. As bar 104 is depressed, support 100 remains stationary and the leading edge of cassette 102 is able to rest flatly on support 100. The operator then slides the cassette almost to its fully loaded position while the feeding mechanism remains in its inoperative position. The final fraction of the cassette movement forces the feeding mechanism 110 off the latch 124, and the feeding mechanism 110 lowers by gravity or other means, until the feed rollers and snubbers engage the sheets in the cassette in preparation for feeding.

Feeding mechanism 110 which includes two feed rollers 111, as seen best in FIG. 2, are supported for movement with frame 141. In addition to the feed rollers, a pair of paper snubbers 142 are movably supported on frame 141 so that they can be lifted with the frame to their inoperative position and moved relative to the frame to permit the feeding of individual sheets as described above. Frame 141 is supported to move in the vertical plane, in response to the movement of arm 103, carrying both the feed rollers 111 and snubbers 142 with it.

FIG. 4a shows the position of arm 132 when the feeding mechanism 110 is in its operative position as shown in FIG. 3c, and FIG. 4b shows the position of arm 132 when the feeding mechanism is in its inoperative position as shown in FIG. 3a.

When bar 104 is depressed, as shown in FIG. 3a, arm 103 rotates in the counterclockwise direction lifting latch 124. As the latch moves up, its lip 125 catches pad 133 which is fastened to pivotable arm 132 and carries that end of arm 132 up with it. Arm 132 is able to rotate about pin 131, which is attached to the machine frame, and as pad 133 is carried up by latch 124, the arm 132 rotates in the clockwise direction. Fastened to arm 132 is pin 135 which is the pivot for arm 134. As arm 132 rotates in the clockwise direction, arm 134 is lifted with it and since the thick end of arm 134, or that portion of arm 134 to the left of 135 in FIGS. 4a–b, strikes the support 100, arm 134 rotates in the counterclockwise direction. As arm 134 rotates in the counterclockwise direction, lip 136, located to the right of pin 135 in FIGS. 4a–b, moves up relative to the machine frame. Lip 136 is adapted to engage the bottom edge of frame 141 and carry frame 141 up as arm 132 continues to rotate in the clockwise direction. When arm 132 is in its full clockwise direction, the inoperative position shown in FIG. 4b is reached and the feed rollers 111 and paper snubbers 142 reach their respective inoperative positions.

After the leading edge of the cassette is located on the surface of support 100 and the feed rollers and snubbers are located in their respective inoperative positions in response thereto, cassette 102 is manually pushed towards the feeding mechanism until it reaches its fully loaded position. At this position, the trailing edge of the cassette is completely supported by the surface of support 100. During the final movement of the cassette, its leading edge contacts pad 133 and pushes it off of the lip portion 125 of latch 124. Once pad 133 is pushed from the lip 125, it falls to the position shown in FIG. 3c, due to gravity or any appropriate biasing mechanism, causing arm 132 to move in the counterclockwise direction, arm 134 to move in the clockwise direction, and frame 141 to lower the rollers and snubbers to their operative positions contacting the top sheet in the cassette.

As mentioned above, FIG. 3b shows the orientation of the various elements in the loading device at a time when no cassette occupies the support 100, or when an empty cassette rests on the support. Arm 103 assumes the position shown during these two conditions due to the presence of a device which biases it in the clockwise direction. Any suitable device can be used for this purpose such as spring 105. It is pointed out that the feeding mechanism is in an operative position for feeding, however, since there are no sheets in the cassette available for feeding, the snubbers 142 and rollers 111 rest on the support 100. Although arm 103 is at an incline to the support 100, the lip 125 of latch 124 is located under pad 133 due to the fact that the latch can rotate about pin 107 and is biased in the counterclockwise direction by any suitable device such as spring 106.

In order to load the cassette, the operator of the copier places the leading edge of the cassette on support 100. The bottom of the cassette pushes bar 104 down so that it is level with the support 100 and the cassette can rest on the support flatly. Since bar 104 is brought to a point level with the support, arm 103 moves in the counterclockwise direction raising latch 124 with it. Due to the relationship of pad 133 with latch 124, the latch causes pad 133 to move from the position shown in FIG. 4a to the position shown in FIG. 4b. This change in position of the pad causes lip 136 to raise frame 141 and rollers 111 and snubbers 142 to their inoperative positions shown in FIG. 3a.

Once the various elements in the loading device reach the positions shown in FIG. 3a, which occurs nearly instantaneously in response to the leading edge of the cassette being placed on support 100, the operator pushes the cassette towards the feeding mechanism 110. The elements of the loading device remain as shown in FIG. 3a until the leading edge of the cassette comes within a very short distance of its fully loaded position. In the last small movement of the cassette, the loading device is triggered so that its elements assume the positions shown in FIG. 3c. Just as the cassette reaches its fully loaded position, the leading edge of the cassette pushes pad 133 off the lip portion 125 of latch 124 so that the pad 133, arm 132 and the attendant mechanism for lifting the feeding mechanism to its inoperative position, drops to its lowest position. This action allows rollers 111 and snubbers 142 to engage the top sheet in the cassette in preparation for feeding sheets to the copier.

As sheets are fed from the cassette the rollers and snubbers are kept in contact with the top sheet due to gravity and the arm 103 moves in the clockwise direction due to the lessening of the stack height. When all of the sheets have been fed from the cassette, the action of spring 105, counterbalancing the ever-lightening cassette, causes arm 103 to return to the position shown in FIG. 3b. Latch 124 is allowed to move below pad 133 due to the fact that it can rotate about pin 107 and once the lip portion 125 is below the pad, the latch is urged to the right under the pad by spring 106 in preparation to loading the next cassette in the machine.

In addition to the apparatus outlined above, many other modifications and/or additions to this invention will be readily apparent to those skilled in the art upon reading this disclosure and these are intended to be encompassed within the invention disclosed and claimed herein.

What is claimed is:

1. An apparatus for automatically positioning a sheet feeding mechanism of a copier in response to the positioning of a sheet containing cassette along a predetermined path of travel during the loading of the cassette into the copier, including:
    first means for removing the feeding mechanism from the path of the cassette to an inoperative position spaced therefrom, said first means being actuated in response to the cassette reaching a first position along the path of travel thereof; and
    second means, actuated in response to the cassette reaching a second position along the path of travel thereof, for moving the feeding mechanism from the inoperative position to an operative position wherein the feeding mechanism engages the uppermost sheet of sheet material disposed in the cassette.

2. Apparatus for avoiding contact between the leading edges of sheets contained in a cassette and the feeding mechanism of a copier, the feeding mechanism adapted to feed sheets from the cassette to the copier, as the cassette is being loaded into the copier including
    cassette support means attached to the copier having a feeding end adjacent the feeding mechanism and an open end external to the copier, the support means adapted to enable the leading portion of the cassette to be moved along a path from its open end to its feeding end, and
    means to remove the feeding mechanism from the path of the cassette in response to the cassette being placed on the support means and maintain the feeding mechanism so removed as the cassette is being moved from said open end to said feeding end so that contact between the sheets in the cassette and feeding mechanism is avoided during the loading of the cassette into the copier, and
    means to engage the top sheet in the cassette with the feeding mechanism in response to the leading portion of the cassette reaching the feeding end of the support means so that sheets are feedable from the cassette to the copier when the cassette is loaded into the copier.

3. Apparatus for avoiding contact between the leading edge of sheets contained in a cassette and feed rollers and paper snubbers of a copier, the feed rollers and paper snubbers adapted to feed sheets from the cassette to the copier, as the cassette is being loaded into the copier and locating the feed rollers and paper snubbers in feeding relationship with the sheets in the cassette when the cassette is loaded into the copier including
    cassette support means attached to the copier having a feeding end adjacent the feed rollers and paper snubbers and an open end external to the copier, the support means adapted to enable the leading portion of the cassette to be moved along a path from its open end to its feeding end,
    a movable frame supporting the feed rollers and paper snubbers normally positioned so that the feed rollers and paper snubbers rest on the sheets in the cassette in a feeding relation therewith and movable to a loading position at which the feed rollers and paper snubbers assume their inoperative positions above the paths of the cassette,
    a pivotable arm having a bar on one end adjacent said open end and a latch on the other end adjacent said feeding end, the arm adapted to pivot relative to the support means so that as the bar moves down, the latch moves up,
    linkage means movably connected to the frame and engageable by the latch adapted to lift the frame to its loading position in response to being engaged and lifted by the latch, and
    means to bias the arm so that the bar normally assumes a position above the support means whereby the bar is forced down to the level of the support means and the latch lifts the linkage means in response to a cassette being passed on the support means, the leading portion of the cassette being adapted to disengage the linkage from the latch as the cassette reaches the feeding end so as to enable the frame to drop the feed rollers and paper snubbers onto the sheets in the cassette in feeding relation therewith.

References Cited
UNITED STATES PATENTS

| | | | |
|---|---|---|---|
| 2,893,729 | 7/1959 | Perzentka | 271—61 X |
| 3,497,206 | 2/1970 | Tippy | 271—61 |
| 3,367,487 | 2/1968 | Dwyer | 271—61 X |
| 3,310,303 | 3/1967 | Schmidt | 271—61 X |
| 3,350,089 | 10/1967 | Niccoli | 271—21 X |

EVON C. BLUNK, Primary Examiner

B. H. STONER, JR., Assistant Examiner

U.S. Cl. X.R.

271—21